(12) United States Patent
Sengupta et al.

(10) Patent No.: US 11,210,121 B2
(45) Date of Patent: *Dec. 28, 2021

(54) MANAGEMENT OF ADVANCED CONNECTION STATE DURING MIGRATION

(71) Applicant: Nicira, Inc., Palo Alto, CA (US)

(72) Inventors: Anirban Sengupta, Saratoga, CA (US); Subrahmanyam Manuguri, San Jose, CA (US); Raju Koganty, San Jose, CA (US); Chidambareswaran Raman, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 579 days.

This patent is subject to a terminal disclaimer.

(21) Appl. No.: 15/178,402

(22) Filed: Jun. 9, 2016

(65) Prior Publication Data

US 2017/0359414 A1 Dec. 14, 2017

(51) Int. Cl.
*G06F 9/455* (2018.01)
*H04L 12/927* (2013.01)

(52) U.S. Cl.
CPC ............ *G06F 9/45558* (2013.01); *G06F 2009/45595* (2013.01); *H04L 47/80* (2013.01)

(58) Field of Classification Search
CPC .. H04L 67/1095; H04L 47/80; G06F 9/45558
See application file for complete search history.

(56) References Cited

U.S. PATENT DOCUMENTS

| | | | | |
|---|---|---|---|---|
| 9,215,210 | B2 * | 12/2015 | Raman | H04L 63/0272 |
| 9,552,219 | B2 * | 1/2017 | Zhang | H04L 41/0813 |
| 9,569,233 | B2 * | 2/2017 | Masters | G06F 9/505 |
| 10,735,376 | B2 * | 8/2020 | Raman | H04L 63/0227 |

OTHER PUBLICATIONS

Tavakoli et al., (A Framework for Security Context Migration in a Firewall Secured Virtual Machine Environment, Eunice 2012, LNCS 7479, pp. 41-51, 2012.) (Year: 2012).*
Xianqin et al., (Seamless Virtual Machine Live Migration on Network Security Enhanced Hypervisor, IEEE 2009, pp. 847-853) (Year: 2009).*
Nadgowda (Cargo: Understanding container migration, IBM developerWorks, Dec. 17, 2015, 4 pages) (Year: 2015).*

* cited by examiner

*Primary Examiner* — Oleg Korsak
(74) *Attorney, Agent, or Firm* — Patterson & Sheridan, LLP (57) ABSTRACT

Techniques for transferring connection data for a migrated virtual computing instance are described. The connection data transfer process includes the steps of, responsive to determining the virtual computing instance is to be migrated, transmitting the connection data, from a first memory buffer shared between a first instance of a service virtual computing instance and a first hardware abstraction layer executing in a source host, to a second memory buffer shared between a second instance of the service virtual computing instance and a second hardware abstraction layer executing in a destination host; responsive to determining the virtual computing instance is stopped in the source host, packing connection data changes including changes made to the connection data at the source host during a time period beginning when the connection data is copied and ending when the virtual computing instance is stopped; and transmitting the connection data changes to the destination host.

19 Claims, 4 Drawing Sheets

MANAGEMENT OF ADVANCED CONNECTION STATE DURING MIGRATION

BACKGROUND

Virtual machines (VMs) are "virtualized" versions of computer systems. Supervisory software such as a hypervisor abstracts computer hardware from software executing in a VM. VMs provide benefits such as security, scalability, robustness, and other benefits. A firewall can be implemented within a virtualization computer system to manage network flows of VMs. Firewalls provide network security to computer systems by blocking unwanted network traffic.

Firewalls are configured with rules which describe what types of network traffic to block and what types of network traffic to allow. Some firewalls also maintain connection data that improve firewall performance by reducing the number of rules that need to be examined. Management of connection data for VMs that are migrating from one host to another host can be complex because firewalls at the destination host do not necessarily store connection data for the migrated VM. As a result, the firewalls at the destination host may drop the connections that resume after the VM is migrated to the destination host.

SUMMARY

Embodiments of the present disclosure provide a method for transferring connection data for a virtual computing instance migrated from a source host to a destination host, the connection data specifying data for management of network traffic for the virtual computing instance by a service virtual computing instance. The method includes responsive to determining the virtual computing instance is to be migrated, transmitting the connection data, from a first memory buffer between a first instance of the service virtual computing instance executing in the source host and a first hardware abstraction layer executing in the source host, to a second memory buffer shared between a second instance of the service virtual computing instance executing in the destination host and a second hardware abstraction layer executing in the destination host. The method also includes responsive to determining the virtual computing instance is stopped in the source host, packing connection data changes which include changes made to the connection data at the source host during a time period beginning when the connection data is copied and ending when the virtual computing instance is stopped. The method further includes transmitting the connection data changes to the destination host.

Further embodiments include a non-transitory computer-readable storage medium storing instructions that cause a computer to carry out the above method and a system.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments presented herein provide techniques for transferring connection data for a virtual computing instance migrated from a source host to a destination host, thereby solving the problem of firewalls at the destination host not having the connection data for the migrated virtual computing instance. Virtual machines (VMs) are used herein as a reference example of virtual computing instances and hypervisors as an example of a hardware abstraction layer supporting virtual computing instances. Virtual computing instances such as VMs are contexts that are isolated from each other and that each include at least a user application running therein. Other examples of virtual computing instances include containers that do not have guest operating systems and are implemented using operating system-level virtualization, wherein an abstraction layer is provided on top of the kernel of an operating system on a host computer and each container runs as an isolated process in userspace on the host operating system and shares the kernel with other containers. In one embodiment, a service VM maintains connection data for advanced firewall operations in a buffer that is shared by the service VM and a hypervisor. When a VM is live migrated to a different host, the hypervisor identifies connection data in the shared buffer pertaining to the migrating VM, and packs and transmits such connection data as part of the VM migration. Such packing and transmission of connection data from the shared buffer during the VM migration avoids the inefficient traditional process of copying connection data from memory assigned to the service VM to memory assigned to the hypervisor after the VM migration is initiated, and then copying the same data across the network to the destination host. The traditional process essentially performs a "double copy," and it also requires the service VMs themselves to pack connection data, which may be slow given that the service VMs share processing time with other VMs and may result in timeouts for open connections. Upon receiving the connection data from the shared buffer, the destination host unpacks and copies the transmitted connection data to its own shared buffer so that a service VM running in the destination host can monitor traffic associated with the newly migrated VM. In addition, data pertaining to connections created after the VM migration starts, which would not be available in the source host's shared buffer, is maintained in a "delta buffer" that includes connection changes for the migrating VM as compared with the data transmitted to the destination host from the shared buffer. The service VM in the source host maintains and updates such a delta buffer until the hypervisor suspends operation of the migrating VM, at which point the connection data in the delta buffer is packed and transmitted to the destination host, where the connection data is used to update the destination host's shared buffer so that the service VM running in the destination host can monitor associated network traffic.

Figure 1:
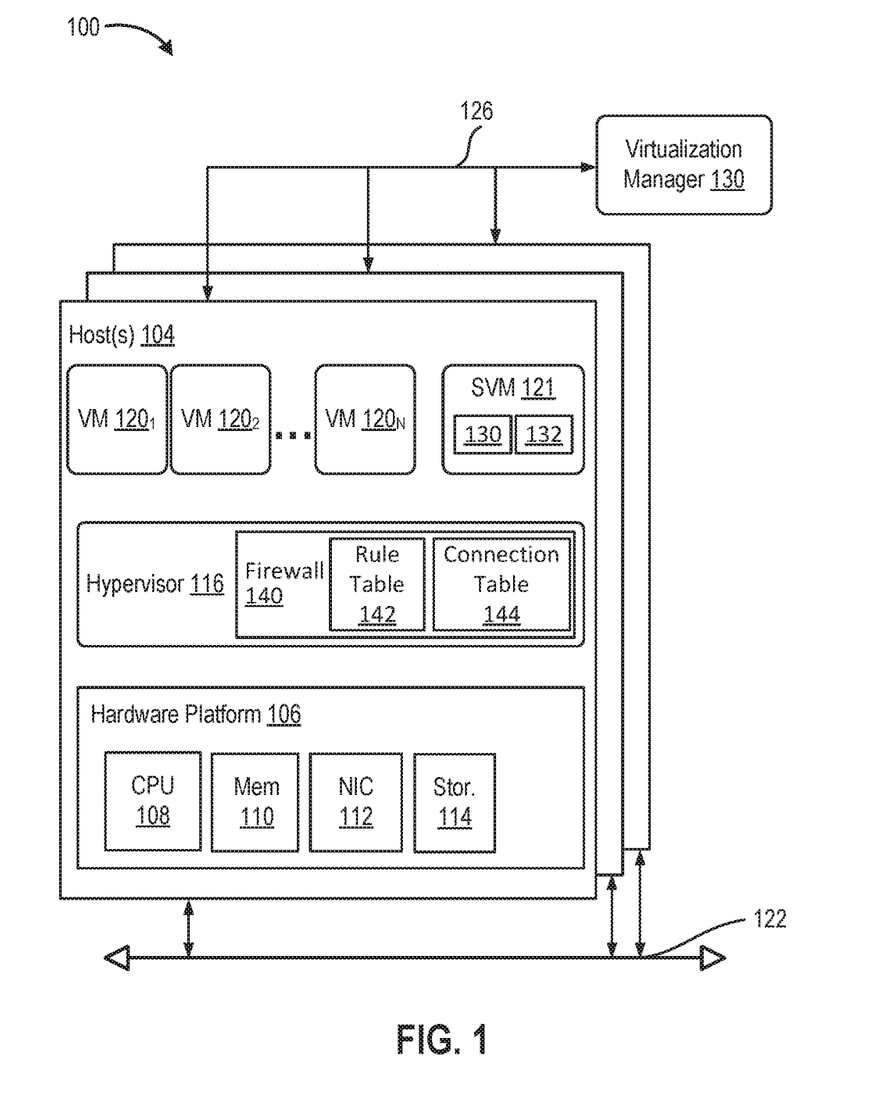
FIG. 1 is a block diagram that illustrates a computer system in which one or more embodiments may be utilized.

FIG. 1 is a block diagram of a computing system 100 in which one or more embodiments of the present disclosure may be utilized. Computing system 100 includes one or more host computer systems 104. Hosts 104 may be constructed on a server grade hardware platform 106, such as an x86 architecture platform, or a consumer grade hardware platform such as a desktop, and a laptop. As shown, hardware platform 106 of each host 104 may include conventional components of a computing device, such as one or more processors (CPUs) 108, system memory 110, one or more network interfaces 112, storage 114, and other I/O devices such as, for example, a mouse and keyboard (not shown). Processor 108 is configured to execute instructions, for example, executable instructions that perform one or more operations described herein and may be stored in memory 110 and in local storage (such as in storage 114). Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within computing system 100. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same host. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc (although it should be recognized that any other virtualization technologies, including Xen® and Microsoft Hyper-V® virtualization technologies may be utilized consistent with the teachings herein). Hypervisor 116 may run on top of the operating system of host 104 or directly on hardware components of host 104.

Computing system 100 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in computing system 100, or alternatively, running as a VM in one of hosts 104. One example of a virtualization management module is the VMware vCenter Server™ product made available from VMware, Inc. Virtualization manager 130 is configured to carry out administrative tasks for computing system 100, including managing hosts 104, managing VMs 120 running within each host 104, provisioning VMs, migrating VMs from one host to another host, and load balancing between hosts 104.

Hypervisors 116 include a firewall 140 which provides firewall services for network traffic outgoing and incoming from VMs 120. Firewall 140 has the capability to filter traffic incoming and outgoing for any particular VM 120 executing in the same host 104 on which firewall 140 is executing. Firewall maintains a rule table 142 that store rules that dictate whether and how to filter traffic. Rules in rule table 142 may block or allow traffic based on certain identifying features. For example, rules may specify combinations of layer 3 ("L3") and layer 4 ("L4") features such as internet protocol (IP) source address, IP destination address, L4 source port, L4 destination port, and protocol identifier.

Because firewall 140 may store a large number of rules, firewall 140 also maintains a connection table 144, which acts as a sort of cache into rule table 142. Entries in connection table 144 identify "flows" or open connections of network traffic that have recently been allowed by firewall 140. Flows may be identified by a particular set of identifying network information, such as internet protocol (IP) source address, IP destination address, layer 4 ("L4") source port, L4 destination port. By caching open connections, firewall 140 does not need to search through rule table 142 for each packet firewall 140 receives.

In operation, firewall 140 receives a network packet and checks whether the network packet is associated with an open connection identified within connection table 144. If firewall 140 determines that no open connection matches the received packet, then firewall 140 checks rule table 142 to determine whether to allow or block the packet. If firewall 140 determines that the packet should be allowed, then firewall 140 places an entry into connection table 144 corresponding to the allowed packet. If firewall 140 subsequently receives a packet that matches an open connection identified by an entry in connection table 144, then firewall 140 allows that packet, without needing to search through rule table 142.

Virtualization manager 130 has the capability to migrate a VM 120 from one host 104 to another host 104 while the VM 120 is executing without any perceptible service interruption. This operation may be referred to herein as live migration or vmotion. To live migrate a VM 120, virtualization manager 130 suspends a VM 120, transfers volatile memory of the VM 120 to a destination host, transfers non-memory state to the destination host, and resumes the VM at the destination host. In some embodiments, virtualization manager 130 pre-copies the data in volatile memory for the VM 120, so that the VM at the destination can be resumed with some data already in volatile memory. In other embodiments, memory is paged into the destination host on demand. In some embodiments, the source host and destination host share common storage, avoiding the need to transfer a virtual disk file including hard disk contents for the VM. In other embodiments, the source and destination do not share a common storage, thus requiring transfer of the virtual disk file from source host to destination host.

When a VM 120 is live migrated from a source host to a destination host, data in the connection table 144 is not present at the destination host. Therefore, upon live migrating a VM, hypervisor 116 also transmits entries of a connection table 144 associated with the migrating VM to the destination host. Firewall 140 at the destination host drops packets until connection table data for the live migrated VM has been received from the source host.

Firewall 140 does not perform advanced application layer firewall services, such as filtering based on network application or even based on content. To provide such services, hosts 104 may execute service VMs 121 which run advanced, application layer firewall software. Service VMs 121 are configured to receive network traffic destined to other VMs 120 and to apply advanced filtering rules to the traffic. One example of a system that allows network flows to be re-routed to service VMs 121 is the Network Extensibility system ("NetX") developed by VMware, Inc., of Palo Alto, Calif.

Service VMs 121 store an advanced filter rule table 130 and an advanced connection table 132 which are analogous to the rule table 142 and connection table 144 maintained by firewall 140. Specifically, rule table 130 stores rules that service VMs 121 apply to network traffic and advanced connection table 132 stores indications of open connections so that service VMs 121 do not need to search through rule table 130 for all traffic. As with connection table 144, when a particular VM 120 is live migrated from one host 104 to another host 104, the source host copies entries in advanced connection table 132 pertaining to the migrating VM 120 from an SVM 121 in the source host 104 to an SVM 121 in the destination host.

One technique for copying data in advanced connection table 132 is to pack (i.e., reformat for placement) the data into a buffer that is transmitted along with data for a VM during live migration (this buffer may be referred to herein as the "vMotion buffer"). In some embodiments, packing the data involves requesting, by SVM 121, from hypervisor 116, a location of a buffer (the vMotion buffer), and storing the data in that buffer. Packing may involve storing a linear list of the connections identified by the 5-tuple of source IP, source port, destination IP, destination port, and protocol. Because the advanced connection table 132 is managed by SVM 121, one approach is for the SVM 121 itself to pack the data from the advanced connection table 132 for placement into the vMotion buffer. Subsequently, hypervisor 116 retrieves the packed data and transmits the data to the destination host in the vMotion buffer. One issue with this approach, however, is that the vMotion buffer may be small in size and unable to store the packed advanced connection table 132 data. Another issue is that SVM 121 shares processing time with other VMs 120 and therefore may not be able to complete the packing operation in an amount of time necessary to avoid timeouts for open connections involving the VM to be live migrated. For example, SVM 121 might not be the next VM scheduled to execute after hypervisor 116 requests SVM 121 to pack the data, thus resulting in a lag time from beginning the live migration to the time that SVM 121 begins to pack the advanced connection table data. Additionally, while packing the data, SVM 121 execution may be preempted to execute a different VM or to execute the hypervisor 116, thereby causing further delay. Yet another disadvantage is that to transmit the packed data to the destination host, hypervisor 116 may copy the packed data from memory assigned to the service VM to memory assigned to hypervisor 116. This copy operation effectively results in an inefficient "double copy," as the hypervisor must copy the data to the memory space assigned to the hypervisor and then must copy the data across the network to the destination host. An alternate technique for packing advanced connection table data that executes more quickly than with the technique described above is described below.

Figure 2A:
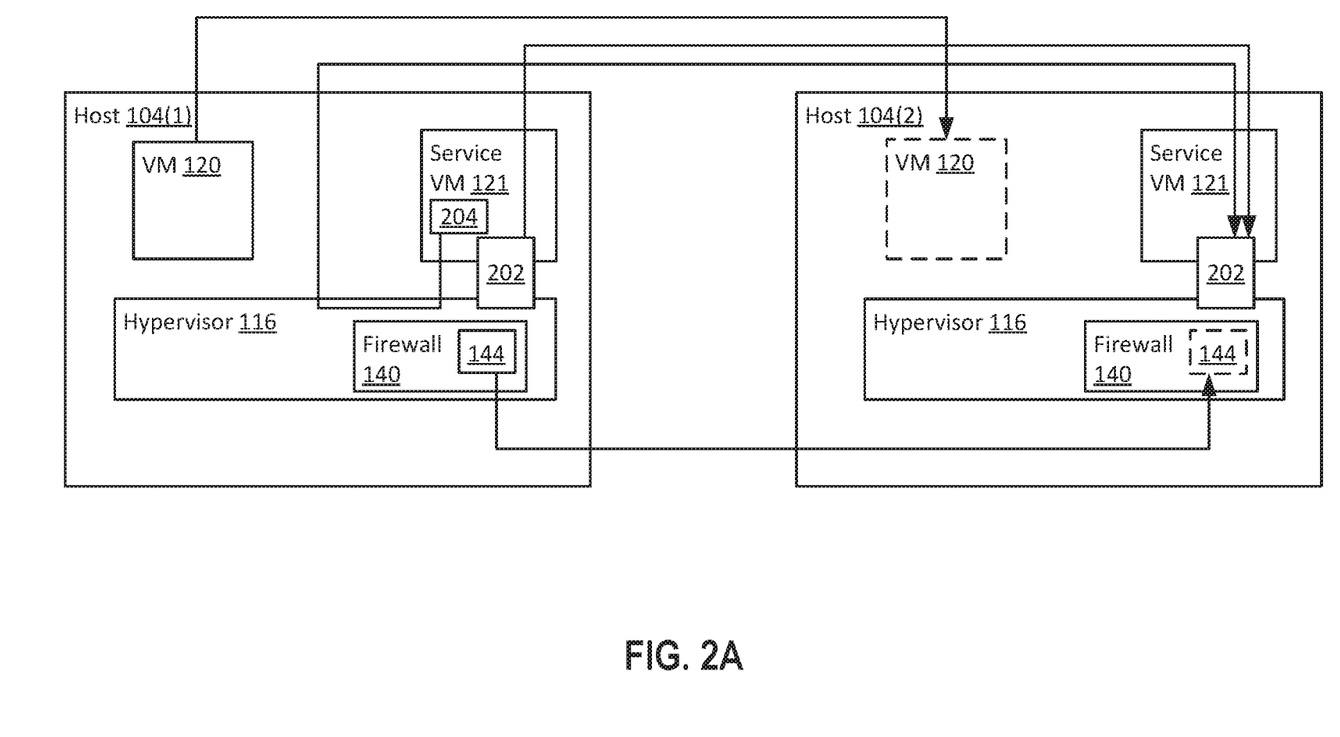
FIG. 2A is a block diagram of computing system, illustrating a live migration operation in which service VM connection data is transmitted, according to an example.

FIG. 2A is a block diagram of computing system 100, illustrating a live migration operation in which service VM connection data is transmitted, according to an example. As shown, a first host 104(1), also referred to herein as a source host 104(1) executes a VM 120 and a service VM 121 with the support of hypervisor 116. Hypervisor includes a firewall 140 that performs operations as described above with respect to FIG. 1. In FIG. 2A, only connection table 144 is shown—rule table 142 is not shown.

Service VM 121 maintains connection data for the advanced firewall operations performed by service VM 121 (such as application layer firewall operations) in a shared buffer 202. Shared buffer 202 is shared in the sense that both service VM 121 and hypervisor 116 are aware of the existence and location of shared buffer 202. In some embodiments, shared buffer 202 is stored in memory allocated to service VM 121 and in other embodiments, shared buffer 202 is stored in memory allocated to hypervisor 116.

Service VM 121 does not directly write to shared buffer 202 but instead makes calls to hypervisor 116 to read and write from and to shared buffer 202. Such calls include a request to read and write particular connection-related entries from or to shared buffer 202. These calls may specify a particular VM that is an endpoint of the connection, and aspects of network traffic that define the connection, such as L2, L3, L4, and L7 details identifying the connection characteristics to the SVM. In some embodiments, the connection has a dynamic nature, such as a file transfer protocol (FTP) connection, which has a control channel and a dynamically negotiated data channel. For such dynamic connections, the aspects of the network traffic that define the connection may include an association characteristic. When a VM is live migrated to a different host, hypervisor 116 identifies the entries in shared buffer 202 that pertain to the migrating VM, packs those entries, and transmits the packed data to the destination host. The hypervisor in the destination host unpacks the connection data and copies the unpacked data to the shared buffer at the destination host so that the service VM in the destination host can monitor traffic associated with the newly migrated VM.

The service VM at the source host may receive network traffic for a migrating VM after the live migration of a VM 120 begins but before the live migration ends. Because hypervisor 116 transmits connection data in the shared buffer when live migration is triggered, and because the migrating VM does not immediately stop executing when live migration is triggered, updates to connection data for the migrating VM may occur after the connection data is transferred to the destination host. Therefore, when live migration begins, hypervisor 116 also requests service VM 121 to maintain a "delta buffer" 204 that describes all changes for the migrating VM as compared with the data transmitted to the destination host from shared buffer 202. Service VM 121 maintains and updates this delta buffer 204 until hypervisor 116 suspends operation of the migrating VM. At this point, hypervisor 116 requests service VM 121 pack the data in delta buffer 204 for inclusion into the vMigrate buffer and hypervisor 116 transmits this information to the destination host. The destination host applies the changes in the packed delta buffer to the shared buffer 202 at the destination host.

The hypervisor at the source host also transmits connection data in connection data table 144 that is associated with the migrating VM to the destination host, which applies that connection data to the connection data table at the destination host.

Both the hypervisor firewall at the destination host and the service VM at the destination host are configured to reject network traffic for the migrating VM prior to receiving some or all of the connection data for that migrating VM from the source host. The hypervisor firewall at the destination host rejects network traffic for the migrating VM prior to receiving all connection data for the migrating VM, but begins processing the network traffic according to the rule table 142 and connection table 144 after receiving all such connection data. The service VM at the destination host determines how much and what types of connection data from the source host is required before beginning to process the network traffic for the migrating VM. In some embodiments, all connection data is needed, while in other embodiments, only connection data of certain types is needed.

Figure 2B:
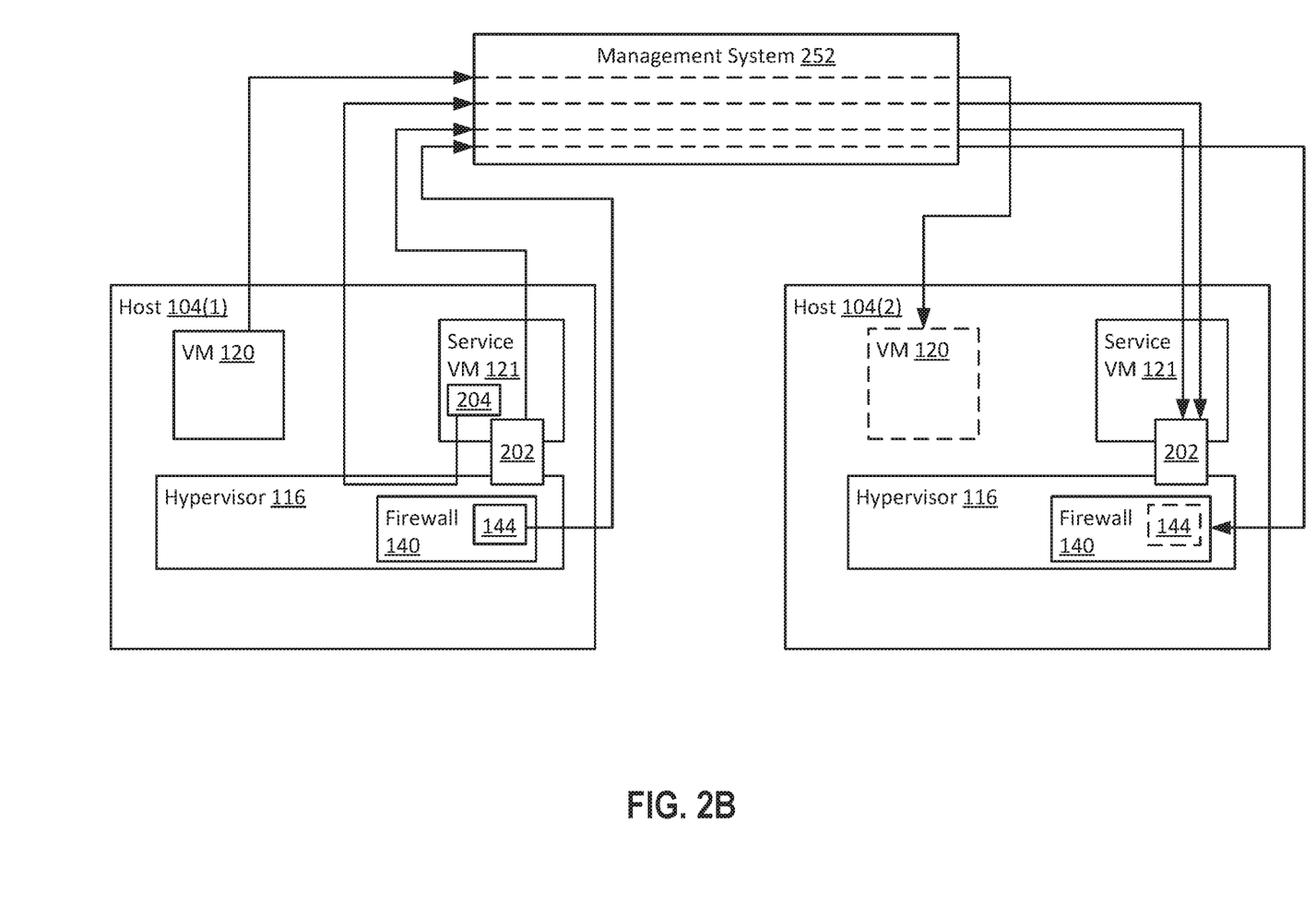
FIG. 2B is a block diagram of a computing system 250 for performing migration of a virtual machine, according to another example.

FIG. 2B is a block diagram of a computing system 250 for performing migration of a virtual machine, according to another example. Computing system 250 is similar to computing system 100 except that computing system 250 includes a management system 252 that mediates migration of VMs between hosts 104. Instead of directly being transferred from a source host to a destination host, VM data, connection data 202, delta buffer data 204, and connection data 144 are first transferred to management system 252 which forwards all of this data to the destination host.

Figure 3:
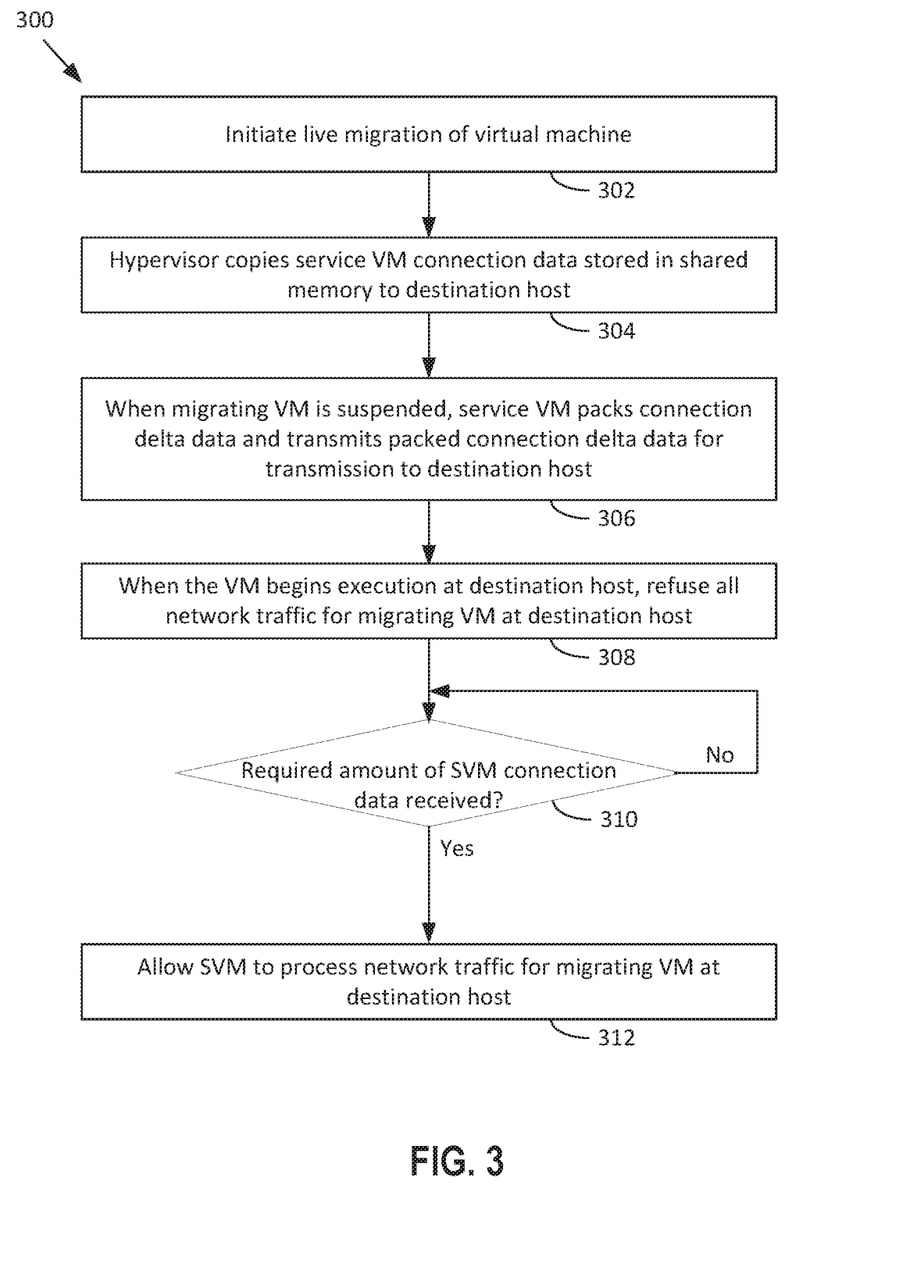
FIG. 3 is a flow diagram of a method for transferring service VM connection data between hosts during a live migration, according to an example.

FIG. 3 is a flow diagram of a method 300 for transferring service VM connection data between hosts during a live migration, according to an example. As shown, method 300 begins at step 302, where a hypervisor at a source host initiates live migration of a virtual machine to a destination host. This live migration may be triggered manually or automatically. In one example, an administrator requests live migration of a VM from the source host to the destination host. In another example, virtualization manager 130 automatically determines that the VM should be transferred from the source host to the destination host for load balancing or for another reason. The hypervisor at the source host may perform certain operations such as pre-copying data from volatile memory of the migrating VM to the destination host and the like.

At step 304, the hypervisor at the source host copies connection data for the service VM at the source host that pertains to the migrating VM to the destination VM. At the source VM, the connection data that is copied is copied from a shared memory buffer that is shared between the service VM and the hypervisor. The shared memory buffer is shared in the sense that both the hypervisor and the service VM are aware of certain aspects of the shared buffer. For instance, the hypervisor may provide application programming interface ("API") calls for writing into and reading from the shared buffer. Writing into and reading from the shared buffer via the API calls may be performed at the granularity of individual connections. Thus, the hypervisor is aware of data for individual connections. The hypervisor is also aware of the VM with which the connection is associated. Upon initiating the live migration of the virtual machine, the hypervisor copies the connection data for the VM that is migrated. Thus, updates to that connection data after live migration is initiated and while the VM to be migrated is still operating are not included within the data transmitted by the hypervisor from the shared buffer to the destination host.

Thus, at step 306, when the migrating VM stops operating in the source host due to being suspended by the hypervisor at the source host, the service VM packs connection delta data and transmits the packed connection delta data for transmission to the destination host. This connection delta data represents the difference in connection data between the time that the live migration of the virtual machine begins and the time that the VM to be transmitted is suspended.

At step 308, when the VM begins execution at the destination host, the service VM refuses all network traffic for that VM. Because the service VM does not yet have connection data for the newly migrated VM, the service VM is unable to perform the advanced firewall operations for the newly migrated VM.

At step 310, the service VM determines whether a required amount of service VM connection data has been received. Service VMs are able to specify a threshold amount of data, which is an amount or type of data that is required for the service VM to begin operation for a newly migrated VM. For example, a service VM may require L3 or L4 details only or may additionally require L7 details as well. If a required amount of connection data has not yet been received, then method 300 returns to the beginning of step 310, looping until a required amount of data has been received. If a required amount of connection data has been received, then method 300 proceeds to step 312, where the service VM at the destination host begins processing network traffic for the migrated VM per the connection data.

Although operations are described above in the context of a live migration, the operations also apply to migration of VMs that are fully shut down. Thus, although certain operations are described above as being triggered by operation of a VM being suspended, in other embodiments, the same operations could be triggered by the operation of a VM being shut down, ending execution of network drivers, or otherwise stopping network operations.

Advantageously, techniques disclosed herein permit connection data for a virtual computing instance to be quickly transferred from a source host to a destination host when the virtual computing instance is migrated to the destination host. Doing so solves the problem of firewalls at the destination host not having required connection data for the migrated virtual computing instance, causing connections to be dropped. Techniques disclosed herein permit the firewalls to provide continuous security policy implementation even in heavy traffic datacenter deployments. In addition, the connections may remain active during the migrations without requiring complicated state synchronization mechanisms.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for transferring connection data for a virtual computing instance migrated from a source host to a destination host, the connection data specifying data for management of network traffic for the virtual computing instance by a service virtual computing instance, the method comprising:
responsive to determining the virtual computing instance is to be migrated, transmitting the connection data, from a first memory buffer between a first instance of the service virtual computing instance executing in the source host and a first hardware abstraction layer executing in the source host, to a second memory buffer shared between a second instance of the service virtual computing instance executing in the destination host and a second hardware abstraction layer executing in the destination host;
responsive to determining the virtual computing instance is stopped in the source host, packing connection data changes which include changes made to the connection data at the source host during a time period beginning when the connection data is copied and ending when the virtual computing instance is stopped; and
transmitting the connection data changes to the destination host, wherein transmitting the connection data and the connection data changes to the destination host comprises transmitting the connection data and the connection data changes to an intermediary computer system, which forwards the connection data and the connection data changes to the destination host.

2. The method of claim 1, further comprising:
blocking network traffic for the virtual computing instance at the destination host until the second instance of the service virtual computing instance is ready to process network traffic for the virtual computing instance at the destination host.

3. The method of claim 2, wherein:
the second instance of the service virtual computing instance is ready to process network traffic when the second instance of the service virtual computing instance has received at least a threshold amount of connection data from the source host.

4. The method of claim 1, further comprising:
processing network traffic based on first hardware abstraction layer firewall connection data for the virtual computing instance via a first firewall executing in the first hardware abstraction layer when the virtual computing instance is operating in the source host; and
processing network traffic based on second hardware abstraction layer firewall connection data for the virtual computing instance via a second firewall executing in the second hardware abstraction layer when the virtual computing instance is operating in the destination host.

5. The method of claim 4, further comprising:
copying the first hardware abstraction layer firewall connection data from the source host to the destination host.

6. The method of claim 4, wherein the first hardware abstraction layer firewall connection data and the second hardware abstraction layer firewall connection data comprise indications of open network connections involving the virtual computing instance.

7. The method of claim 1, further comprising:
filtering network traffic based on the first hardware abstraction layer firewall connection data.

8. The method of claim 1, wherein the virtual computing instance is a virtual machine.

9. The method of claim 1, wherein the virtual computing instance is a container not including an operating system.

10. A system for transferring connection data for a virtual computing instance migrated from a source host to a destination host, the connection data specifying data for management of network traffic for the virtual computing instance by a service virtual computing instance, the system comprising:
the source host;
a virtual computing instance executing in the source host;
a service virtual computing instance executing in the source host; and
a hardware abstraction layer configured to support the virtual computing instance and the service virtual computing instance, and configured to:
responsive to determining the virtual computing instance is to be migrated, transmit the connection data, from a first memory buffer between a first instance of the service virtual computing instance executing in the source host and a first hardware abstraction layer executing in the source host, to a second memory buffer shared between a second instance of the service virtual computing instance executing in the destination host and a second hardware abstraction layer executing in the destination host;
responsive to determining the virtual computing instance is stopped in the source host, pack connection data changes which include changes made to the connection data at the source host during a time period beginning when the connection data is copied and ending when the virtual computing instance is stopped; and
transmit the connection data changes to the destination host, wherein transmitting the connection data and the connection data changes to the destination host comprises transmitting the connection data and the connection data changes to an intermediary computer system, which forwards the connection data and the connection data changes to the destination host.

11. The system of claim 10, wherein the destination host is configured to:
block network traffic for the virtual computing instance at the destination host until the second instance of the service virtual computing instance is ready to process network traffic for the virtual computing instance at the destination host.

12. The system of claim 11, wherein:
the second instance of the service virtual computing instance is ready to process network traffic when the second instance of the service virtual computing instance has received at least a threshold amount of connection data from the source host.

13. The system of claim 10, wherein:
a first firewall executing in the first hardware abstraction layer is configured to process network traffic based on first hardware abstraction layer firewall connection data for the virtual computing instance when the virtual computing instance is operating in the source host; and
a second firewall executing in the second hardware abstraction layer is configured to process network traffic based on second hardware abstraction layer firewall connection data for the virtual computing instance when the virtual computing instance is operating in the destination host.

14. The system of claim 13, wherein the hardware abstraction layer is further configured to:
copy the first hardware abstraction layer firewall connection data from the source host to the destination host.

15. The system of claim 13, wherein the first hardware abstraction layer firewall connection data and the second hardware abstraction layer firewall connection data comprise indications of open network connections involving the virtual computing instance.

16. The system of claim 10, wherein the hardware abstraction layer is further configured to:
filter network traffic based on the first hardware abstraction layer firewall connection data.

17. The system of claim 10, wherein the virtual computing instance is a virtual machine.

18. The system of claim 10, wherein the virtual computing instance is a container not including an operating system.

19. A non-transitory computer-readable medium storing instructions that, when executed by a processor, cause the processor to perform a method for transferring connection data for a virtual computing instance migrated from a source host to a destination host, the connection data specifying data for management of network traffic for the virtual computing instance by a service virtual computing instance, the method comprising:
responsive to determining the virtual computing instance is to be migrated, transmitting the connection data, from a first memory buffer between a first instance of the service virtual computing instance executing in the source host and a first hardware abstraction layer executing in the source host, to a second memory buffer shared between a second instance of the service virtual computing instance executing in the destination host and a second hardware abstraction layer executing in the destination host;
responsive to determining the virtual computing instance is stopped in the source host, packing connection data changes which include changes made to the connection data at the source host during a time period beginning when the connection data is copied and ending when the virtual computing instance is stopped; and
transmitting the connection data changes to the destination host, wherein transmitting the connection data and the connection data changes to the destination host comprises transmitting the connection data and the connection data changes to an intermediary computer system, which forwards the connection data and the connection data changes to the destination host.

* * * * *